(12) United States Patent
Larky et al.

(10) Patent No.: US 8,972,536 B2
(45) Date of Patent: Mar. 3, 2015

(54) SYSTEMS AND METHODS FOR SECURE PROVISIONING OF CONSUMER NETWORK SERVICES

(75) Inventors: Steven Philip Larky, Del Mar, CA (US); Jean-Philippe Cornil, Enghien (BE)

(73) Assignee: Broadcom Corporation, Irvine, CA (US)

( * ) Notice: Subject to any disclaimer, the term of this patent is extended or adjusted under 35 U.S.C. 154(b) by 64 days.

(21) Appl. No.: 13/158,224

(22) Filed: Jun. 10, 2011

(65) Prior Publication Data

US 2012/0317248 A1  Dec. 13, 2012

(51) Int. Cl.
| | | |
|---|---|---|
| G06F 15/177 | (2006.01) | |
| H04L 12/24 | (2006.01) | |
| H04L 12/28 | (2006.01) | |
| G06F 9/445 | (2006.01) | |
| H04L 29/08 | (2006.01) | |

(52) U.S. Cl.
CPC .......... *H04L 41/082* (2013.01); *H04L 12/2801* (2013.01); *G06F 8/665* (2013.01); *H04L 67/34* (2013.01); *H04L 12/283* (2013.01)
USPC .......................................... 709/220; 709/222

(58) Field of Classification Search
USPC .................. 709/203, 220–222, 225
See application file for complete search history.

(56) References Cited

U.S. PATENT DOCUMENTS

| | | | | |
|---|---|---|---|---|
| 5,673,392 A | * | 9/1997 | Nakashima et al. | 708/203 |
| 6,052,803 A | | 4/2000 | Bhatia et al. | |
| 7,116,685 B2 | * | 10/2006 | Brown et al. | 370/485 |
| 8,059,670 B2 | * | 11/2011 | Soni et al. | 370/412 |
| 8,213,971 B2 | * | 7/2012 | Papineau et al. | 455/466 |
| 2003/0046359 A1 | * | 3/2003 | Betz et al. | 709/216 |
| 2004/0103347 A1 | * | 5/2004 | Sneed et al. | 714/32 |
| 2005/0039025 A1 | * | 2/2005 | Main et al. | 713/182 |
| 2005/0263977 A1 | * | 12/2005 | Pan | 280/201 |
| 2006/0168441 A1 | * | 7/2006 | Fujinawa et al. | 713/2 |
| 2008/0008210 A1 | * | 1/2008 | Godlewski | 370/463 |
| 2011/0058657 A1 | * | 3/2011 | Alegret et al. | 379/32.04 |
| 2011/0116419 A1 | * | 5/2011 | Cholas et al. | 370/259 |
| 2012/0034882 A1 | * | 2/2012 | Kauffman | 455/73 |
| 2012/0093207 A1 | * | 4/2012 | Toon | 375/222 |

FOREIGN PATENT DOCUMENTS

WO   WO 01/45414   6/2001

\* cited by examiner

*Primary Examiner* — Joshua Joo
(74) *Attorney, Agent, or Firm* — McDermott Will & Emery LLP

(57) ABSTRACT

Provided are systems and methods for secure provisioning of consumer network services. For example, there is a broadband modem for secure provisioning of a network service, where the broadband modem includes a controller having an embedded memory. The controller is configured to enable an unmanaged interface of the broadband modem, to establish a subscription interface link over the enabled unmanaged interface, and to download, over the subscription interface link, a subscriber firmware enabling a managed interface corresponding to the network service. Power cycling the broadband modem erases the downloaded subscriber firmware and disables the managed interface.

19 Claims, 4 Drawing Sheets

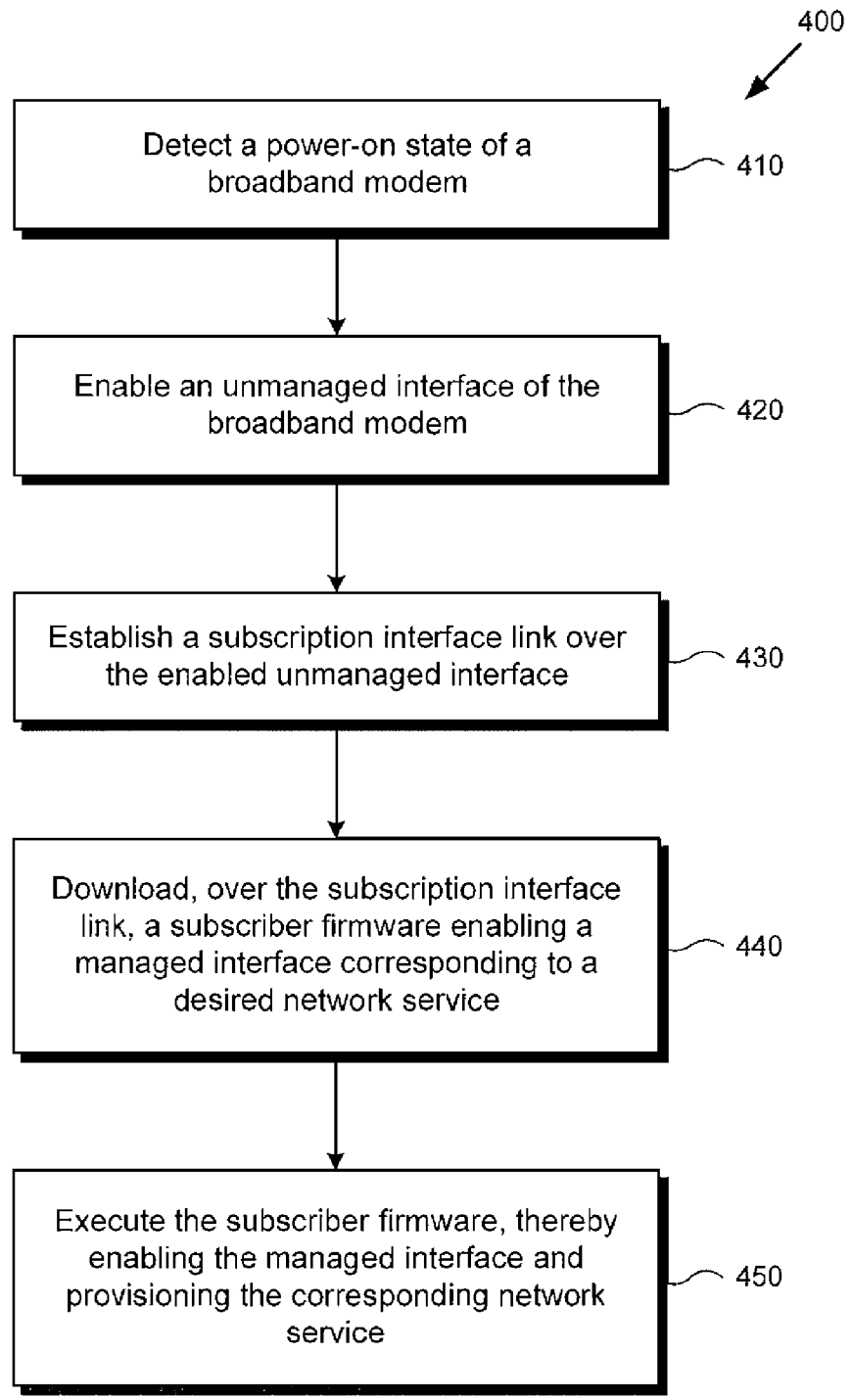

SYSTEMS AND METHODS FOR SECURE PROVISIONING OF CONSUMER NETWORK SERVICES

BACKGROUND OF THE INVENTION

1. Field of the Invention

The present invention relates generally to network services. More particularly, the present invention relates to provisioning of network services.

2. Background Art

As consumer desire to access information has increased over time, providers of such access have increasingly turned to tiered systems to automatically parcel out and bill for such access. Tiered systems allow a subscriber to choose a particular tier based on their specific usage, which can increase subscriber satisfaction with their service.

Unfortunately, tiered systems require a robust provisioning system to enforce the tiers, and some conventional insecure provisioning systems used to create and enforce such tiers have been compromised by subscribers in order to access information outside their particular subscription. This has led to a loss of subscribers due to congestion perceived as oversubscription, and has reduced the cost effectiveness of the tiered system overall.

Additionally, access providers, such as internet access providers (ISPs), have bundled different types of network services in with their primary access subscription in order to better compete with other ISPs. But, this bundling has led to ever-increasing costs of hardware used to provide each type of network service, and thus any susceptibility to manipulation by subscribers has a multiplicative risk of loss to the ISPs.

Accordingly, there is a need to overcome the drawbacks and deficiencies in the art by providing cost effective systems and methods for secure provisioning of network services.

SUMMARY OF THE INVENTION

The present application is directed to systems and methods for secure provisioning of consumer network services, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 presents flowchart of a method for secure provisioning of consumer network services, according to one embodiment of the present invention.

DETAILED DESCRIPTION OF THE INVENTION

Figure 1:
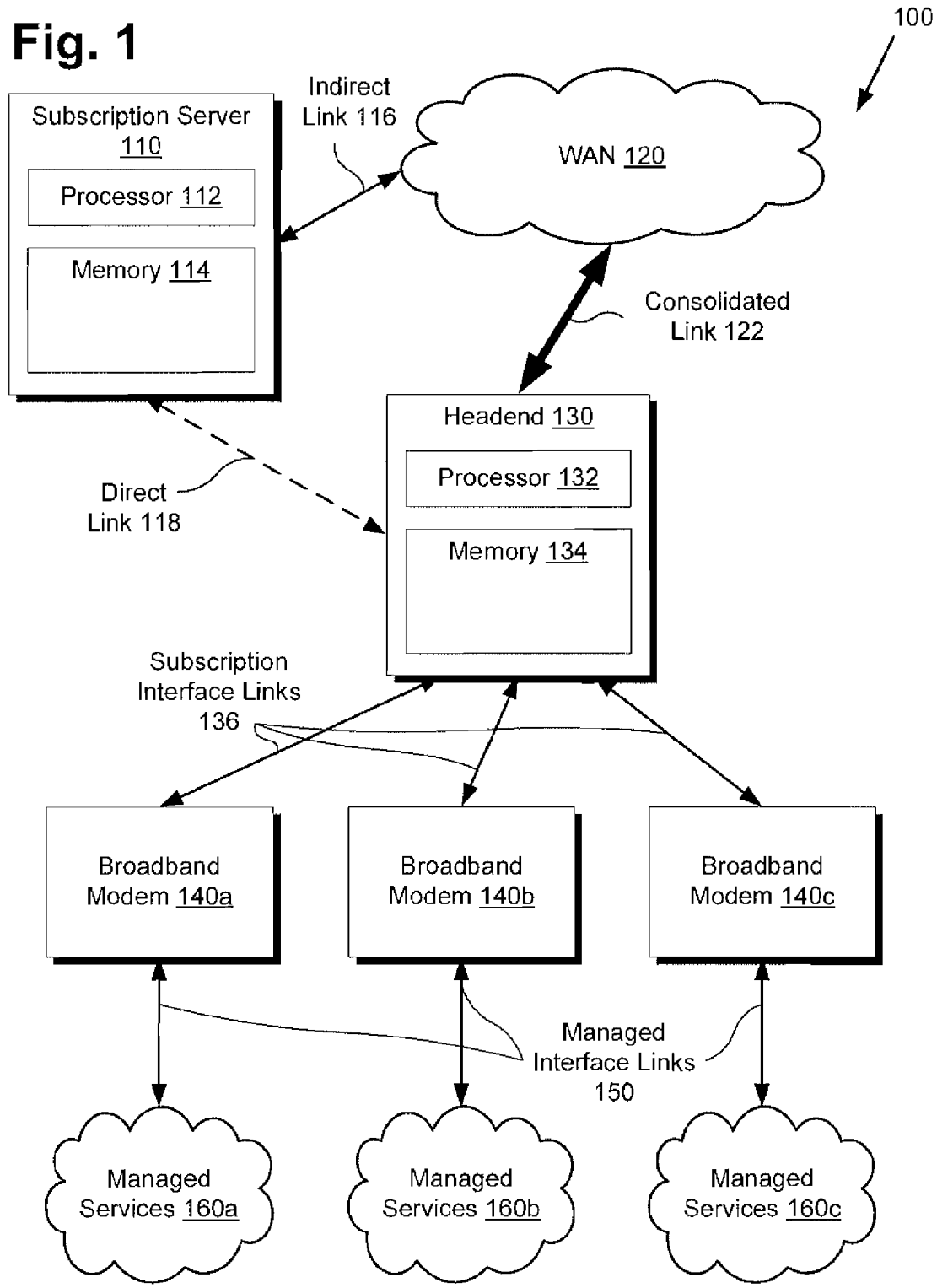
FIG. 1 presents a diagram of a system for secure provisioning of consumer network services, according to one embodiment of the present invention.

The present application is directed to systems and methods for secure provisioning of consumer network services. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 3A:
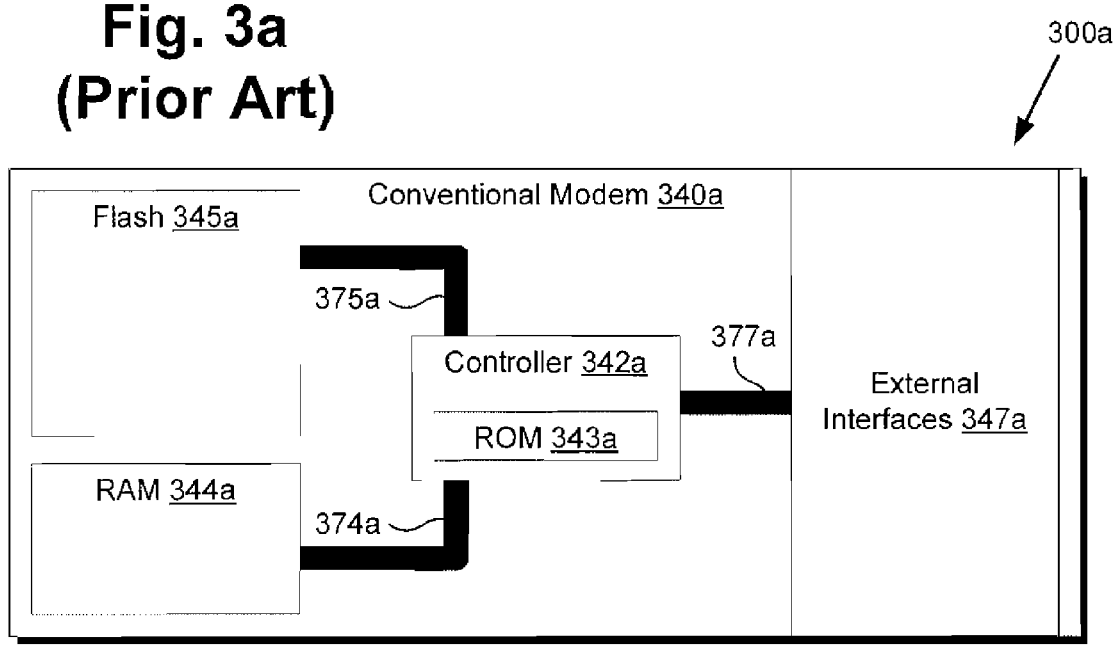
FIG. 3a presents a diagram of a conventional system.

FIG. 3a shows conventional modem 340a typically used by internet service providers (ISPs) to provide internet access to their subscribers, and exemplifies some of the undesirable attributes of conventional provisioning systems. As shown in FIG. 3a, conventional modem 340a includes controller 342a linked to volatile random access memory (RAM) 344a, relatively large flash 345a and external interfaces 347a using respective interface links 374a, 375a and 377a. As can be seen from FIG. 3a, flash 345a of conventional modem 340a is typically a relatively large non-volatile flash memory, such as 4-8 megabytes or larger, sized to store an operating system, configuration data, and any software required to use external interfaces 347a. External interfaces 347a include at least one subscription interface, such as a digital subscriber line (DSL) interface, for example, and at least one user interface to provide internet access to a subscriber. Typical conventional modems, however, include multiple user interfaces, each of which require additional software to be stored in flash 345a.

In order for internet service providers (ISPs) to compete for subscribers, additional user interfaces and user interface functionality may be designed into conventional modem 340a, which requires further additional software to be stored in flash 345a, which, in turn, necessitates a larger flash 345a. However, flash memory is relatively expensive, and can account for a large fraction of the total cost of conventional modem 340a, particularly as additional user interfaces are added to external interfaces 347a. Thus, the initial cost to an ISP to provide internet access to a subscriber is undesirably large, and furthermore undesirably increases with competitive pressure for features.

In addition, upon being power cycled, and in part because flash 345a contains all software required to use all external interfaces 347a, conventional modem 340a enables all interface links 374a, 375a and 377a, as well as all external interfaces 347a. This typically means that regardless of whether a subscription interface link is established, any feature-rich and relatively expensive to implement user interfaces are functional. As such, conventional modem 340a is undesirably portable, meaning that a subscriber may discontinue service with a first ISP providing the modem yet keep the relatively expensive added functionality of the modem and perhaps use it with a competitor second ISP. Thus, an ISPs return on investment for providing competitive functionality may be undesirably foreshortened.

Moreover, because flash 345a is non-volatile storage, technologically adept subscribers may be able to more easily access data in flash 345a, such as operating system data, configuration data, and software used to enable any of external interfaces 347a, and be able to clandestinely manipulate conventional modem 340a into supplying internet access or other functionality that is, for example, outside their subscription limits or against their ISP's terms of service.

Figure 3B:
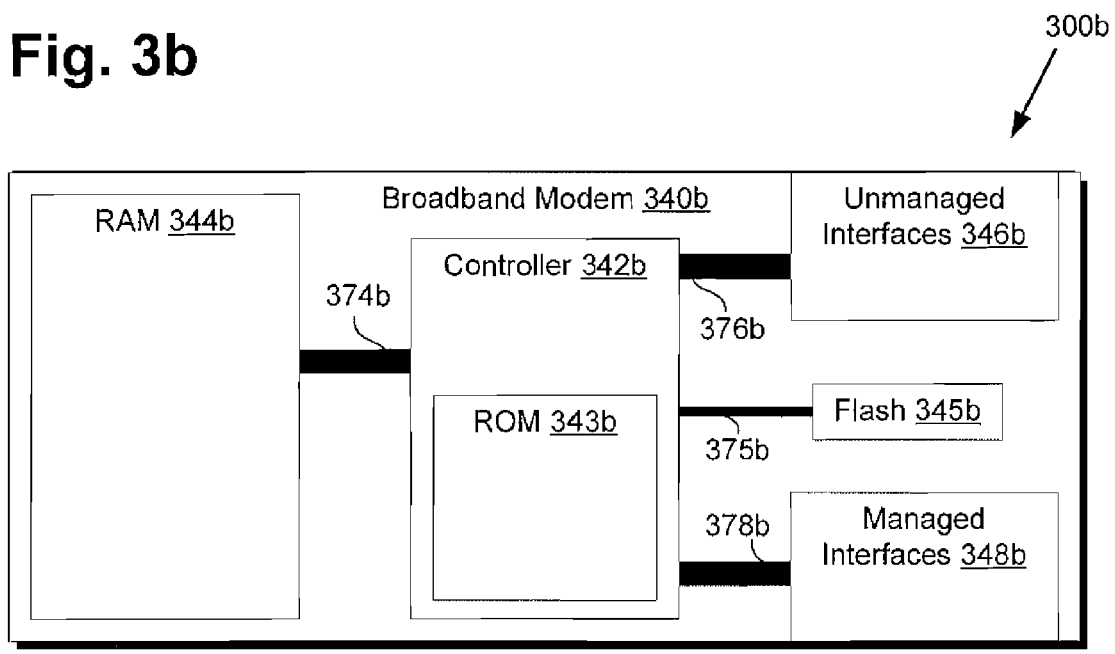
FIG. 3b presents a diagram of a system for secure provisioning of consumer network services, according to one embodiment of the present invention.

FIG. 3b shows broadband modem 340b for securely provisioning network services, according to one embodiment of the present inventive concepts, that addresses many of the undesirable features of conventional modem 340a detailed above. As shown in FIG. 3b, broadband modem 340b includes controller 342b with relatively large embedded memory, such as read-only memory (ROM) 343b, volatile RAM 344b, relatively small flash 345b, unmanaged interfaces 346b and managed interfaces 348b. Controller 342b may comprise, for example, any processor that can be configured to execute code for securely provisioning a network service, such as internet access, for example, or a collection of managed interfaces, as will be explained more fully below. Controller 342b may include relatively large embedded memory, such as ROM 343b, for example, that may be an on-chip non-volatile memory sized to store enough software to enable and utilize unmanaged interfaces 346b, as well as to initialize controller 342b. ROM 346b may be programmed at a time of fabrication, for example, by a manufacturer according to specifications provided by, for example, an ISP.

ROM 346b may be made relatively large without significantly increasing a cost of, for example, controller 342b, as the fabrication process for controller 342b may not be substantially altered when fabricating a relatively large ROM. In some embodiments, ROM 346b may be one megabit in size without significantly increasing a cost or power requirement for controller 342b. By way of contrasting example, ROM 343a of controller 342a in FIG. 3a is typically much smaller than ROM 343b of controller 342b, and is sized only to store enough data to initialize controller 342a since controller 342a can access a large volume of non-volatile data stored on flash 345a.

At a start up time of broadband modem 340b, such as entering a powered state for example, controller 342b may be configured to automatically enable unmanaged interfaces 346b using software stored in ROM 343b. Unmanaged interfaces 346b may comprise one or more subscription interfaces, for example, such as a DSL interface, that can be used to establish a subscription interface link with an ISP, for example, using software such as a DSL physical layer (PHY) situated within ROM 343b, for instance. Upon establishing a subscription interface link, controller 342b may be configured to download, over the subscription interface link, a subscriber firmware that enables managed interfaces 348b, for example, thus allowing controller 342b to provision network services corresponding to enabled managed interfaces 348b. Downloaded subscriber firmware may be stored in volatile RAM 344b, for example, or in a volatile cache memory of controller 342b, for instance, and may be automatically erased when broadband modem 340b loses power. Thus, upon power cycling broadband modem 340b, such as re-establishing power after power loss, or after a software enabled re-boot, for example, the downloaded subscriber firmware may be erased so as to disable managed interfaces 348b.

Because controller 342b internally includes enough software to enable and utilize unmanaged interfaces 346b, broadband modem 340b may be configured to provision network services much more securely than is possible by, for example, conventional modem 340a. For instance, software stored in ROM 343b and/or RAM 344b of broadband modem 340b may be extremely difficult for a subscriber to access or manipulate, as compared to accessing software in flash 345a of conventional modem 340a, for example. In addition, because only unmanaged interfaces 346b are enabled and able to be utilized at start up, there may be fewer access points to harden against subscriber intrusion at start up, which can simplify implementing protective security measures. Furthermore, broadband modem 340b may include a multitude of additional user interfaces within managed interfaces 348b without risking portability and loss of return on investment, as described above, because that competitive functionality may only be enabled when the subscriber allows broadband modem 340b to establish a valid subscription interface link over unmanaged interfaces 346b, as described above.

Also shown in FIG. 3b is relatively small flash 345b coupled to controller 342b using interface link 375b. In some embodiments, such as that shown in FIG. 3B, broadband modem 340b may include a relatively small flash, such as flash 345b, sized to store subscriber configuration data, for example. In one embodiment, flash 345b may be embedded in controller 342b. In such embodiments, controller 342b may be configured to establish a subscription interface link using subscriber configuration data stored in flash 345b, such as a username and a password for authenticating a subscriber, for example. Flash 345b may be approximately as small as 8 kilobytes, for instance, and thus be much less expensive to include in broadband 340b than, for example, conventionally large flash 345a in conventional modem 340a. Also, because of the relatively small size of flash 345b, interface link 375b may be a relatively low speed and inexpensive to implement interface link as compared to interface link 375a of conventional modem 340a, for example. By contrast, RAM 344b may be the same size as RAM 344a of conventional modem 340a, for example, or may be substantially larger than RAM 344a without significantly increasing a cost of broadband modem 340b, for instance, due to the relatively low cost of volatile memory. Thus, RAM 344b may be sized sufficiently to store downloaded subscriber firmware, for example, as well as any working data used to facilitate use of a wide array of user interfaces within managed interfaces 348b, for instance, without significantly increasing a cost of broadband modem 340b.

Although interface links 374b, 375b and 378b are depicted as separate from managed interfaces 348b in FIG. 3b, this should not be taken as a limitation of the present inventive concepts. For example, in other embodiments, ROM 343b may only contain enough software to enable and utilize interface link 376b and unmanaged interfaces 346b, such that controller 342b is unable to enable or utilize interface links 374b, 375b or 378b, or corresponding RAM 344b, flash 345b or managed interfaces 348b, before establishing a subscription interface link over unmanaged interfaces 346b and downloading subscriber firmware enabling each item. In such embodiments, interface links 374b, 375b or 378b may be considered managed interfaces, as described above, that are disabled and secured upon power cycling broadband modem 340b. In other embodiments, interface links 374b and/or 375b may be considered unmanaged interfaces and be enabled upon initialization of controller 342b, for example.

Additionally, although unmanaged interfaces 346b have been described above as including a subscription interface link, it should be understood that unmanaged interfaces 346b may include additional interfaces also enabled by controller 342b using software stored within ROM 343b, for example, that may be utilized to facilitate troubleshooting, for instance, or a particular means of subscriber authentication. For example, in some embodiments, unmanaged interfaces 346b may include a serial port interface, for example, configured to provide debug information under fault conditions. In other embodiments, unmanaged interfaces 346b may include a universal serial bus (USB) interface, for example, and controller 342b may be configured to establish a subscription interface link over the USB interface, for instance, using a USB modem for example. Alternatively, where unmanaged interfaces 346b includes a subscription interface in addition to a USB interface, controller 342b may be configured to establish a subscription interface link over a subscription interface separate from the USB interface, but use the USB interface for a multi-part authentication of the subscription interface link, utilizing a USB security dongle, for example.

FIG. 1 shows provisioning system 100 configured to securely provision network services using one or more broadband modems similar to broadband modem 340b in FIG. 3b, according to one embodiment of the present inventive concepts. As shown in FIG. 1, provisioning system 100 includes subscription server 110, wide area network (WAN) 120, headend 130, broadband modems 140a, 140b and 140c, and respective managed services 160a, 160b and 160c. Although provisioning system 100 is depicted as including only one subscription server, one headend and three broadband modems, it should be understood that this is not a limitation of the present inventive concepts, and, in other embodiments, provisioning system 100 may include multiple subscription servers, multiple headends, perhaps multiple layers of headends, and any number of broadband modems linked to each headend.

As noted above, broadband modems 140a, 140b and 140c in FIG. 1 correspond to broadband modem 340b in FIG. 3b; e.g., each may be configured to exhibit the same features and/or operate substantially the same as its counterpart. For example, Managed interface links 150 couple managed interfaces of broadband modems 140a, 140b and 140c, such as managed interfaces 348b of broadband modem 340b in FIG. 3b, for example, to respective managed services 160a, 160b and 160c. Managed services 160a, 160b and 160c may be subscriber specific, for example, and may include one or more concurrent network services such as wired and wireless networking, for example, routing, network security and the like, as is explained more fully below with reference to FIG. 2.

Also shown in FIG. 1 are subscription interface links 136 coupling broadband modems 140a, 140b and 140c to headend 130. Subscription interface links 136 may comprise any interface capable of establishing a data link between a broadband modem and a headend of an ISP, for example, which may be used to access a wide area network (WAN), such as WAN 120 in FIG. 1. For example, subscription interface links 136 may comprise one or more of a DSL interface link, a broadband cable interface link, or other wired or wireless broadband interface links, for example, with corresponding interfaces within unmanaged interfaces 346b of broadband modem 340b in FIG. 3b, for instance. For instance, subscription interface links 136 may comprise any wired or wireless telephony broadband communications technology or protocol, such as DSL or HSPDA, for example, may comprise asynchronous or synchronous data transfer, may include any version DOCSIS standard technology, and may comprise any number of wireless or mobile broadband technologies, such as WiMAX, for example.

Each subscription interface link 136, as shown in FIG. 1, may comprise an initial subscription interface link established over an enabled unmanaged interface, such as an interface within unmanaged interfaces 346b of broadband modem 340b in FIG. 3b, for example, or may comprise a high bandwidth subscription interface link established over an enabled managed interface, such as an interface within managed interfaces 348b of broadband modem 340b in FIG. 3b, for example. For example, broadband modem 140a may be configured to establish an initial low bandwidth subscription interface link with headend 130 over an unmanaged interface, for example, and then download, over the low bandwidth subscription interface, subscriber firmware enabling a high bandwidth subscription interface corresponding to a high bandwidth subscription interface link, for example. For instance, in one embodiment, an initial subscription interface link may comprise a low bandwidth DSL interface link, for example, which can be used to download subscriber firmware enabling a relatively high bandwidth wireless broadband interface.

As shown in FIG. 1, subscriber firmware may be downloaded from headend 130, for example, and/or from subscription server 110. In embodiments where subscriber firmware is only downloaded from subscription server 110, for example, headend 130 may be used, by an ISP for example, to help establish and/or authenticate subscription interface links 136, for instance, and to consolidate and control access to WAN 120 and subscription server 110 over consolidated link 122 and indirect link 116 or direct link 118, for example. In other embodiments, headend 130 may additionally be used to distribute subscriber firmware to broadband modems 140a, 140b and 140c to enable respective managed services 160a, 160b and 160c.

Headend 130 may comprise any network connected device, for example, capable of accepting multiple subscription interface links, such as subscription interface links 136, for example, and consolidating those links and controlling access to, for example, WAN 120 by broadband modems 140a, 140b and 140c, for example. In some embodiments, headend 130 may be configured to supply downloadable subscriber firmware to coupled broadband modems, for example, such that each broadband modem may only require enough software in its individual ROM, such as ROM 343b of broadband modem 340b in FIG. 3b, for example, to establish a subscription interface link 136 and download the subscriber firmware from headend 130.

In other embodiments, however, where headend 130 may be under considerable load just to facilitate subscription interface links and to consolidate and control access to WAN 120, for example, headend 130 may be configured to instead provide a small portion of subscriber firmware, for example, such as an interne address or routing information for a coupled broadband modem to use to download at least an additional portion of subscriber firmware from subscription server 110.

Under such circumstances, each coupled broadband modem may require additional software in its individual ROM to both establish a subscription interface link to headend 130 and to use routing information, for example, to download subscriber firmware from subscription server 110. Alternatively, a broadband modem may include a ROM, such as ROM 343b in FIG. 3b, for example, with routing information to subscription server 110 already programmed within it. Thus, an ISP may tailor a size of a ROM of a broadband modem according to limitations of an already built infrastructure or other design specifications, in order to minimize overall cost for providing distributed managed services, such as managed services 160a, 160b an 160c, for example.

Subscription server 110 may be configured to provide a single distribution point for subscriber firmware to headend 130 and/or broadband modems 140a, 140b and 140c, for example, to simplify overall network management. Subscription server 110 may comprise any network connectable device that may be configured to accept requests from headend 130 or broadband modems 140*a*, 140*b* and 140*c*, for example, and provide subscriber firmware over, for example, indirect link 116 or direct link 118. In some embodiments, subscription server 110 may supply subscriber specific firmware tailored to a specific subscriber, and may be configured to manage such firmware according to rules instituted by an ISP, for example. In other embodiments, subscription server 110 may be configured to supply a generic subscriber firmware to headend 130, where headend 130 may be configured to make subscriber specific changes to the generic subscriber firmware tailored for each subscriber.

By providing a wide range of management opportunities for subscriber firmware, embodiments of the present invention advantageously provide an ISP with a variety of different ways to optimize a secure network service provisioning system. For example, in some embodiments, provisioning system 100 may omit subscription server 110 in order to reduce intra-network complexity, for example, and put additional load on headend 130. Alternatively, as explained above, provisioning system may be configured such that broadband modems 140*a*, 140*b* and 140*c* download subscriber firmware from subscription server 110, which reduces a load on headend 130 but introduces intra-network complexity and additional programming and possibly size requirements for ROMs of the broadband modems. In all embodiments, however, provisioning system 100 provides secure provisioning of network services, such as managed services 160*a*, 160*b* and 160*c* of FIG. 1, because subscriber firmware is only available to subscribers in a volatile form, as explained above, and because all managed services are disabled upon a loss of power or software enabled re-boot.

Figure 2:
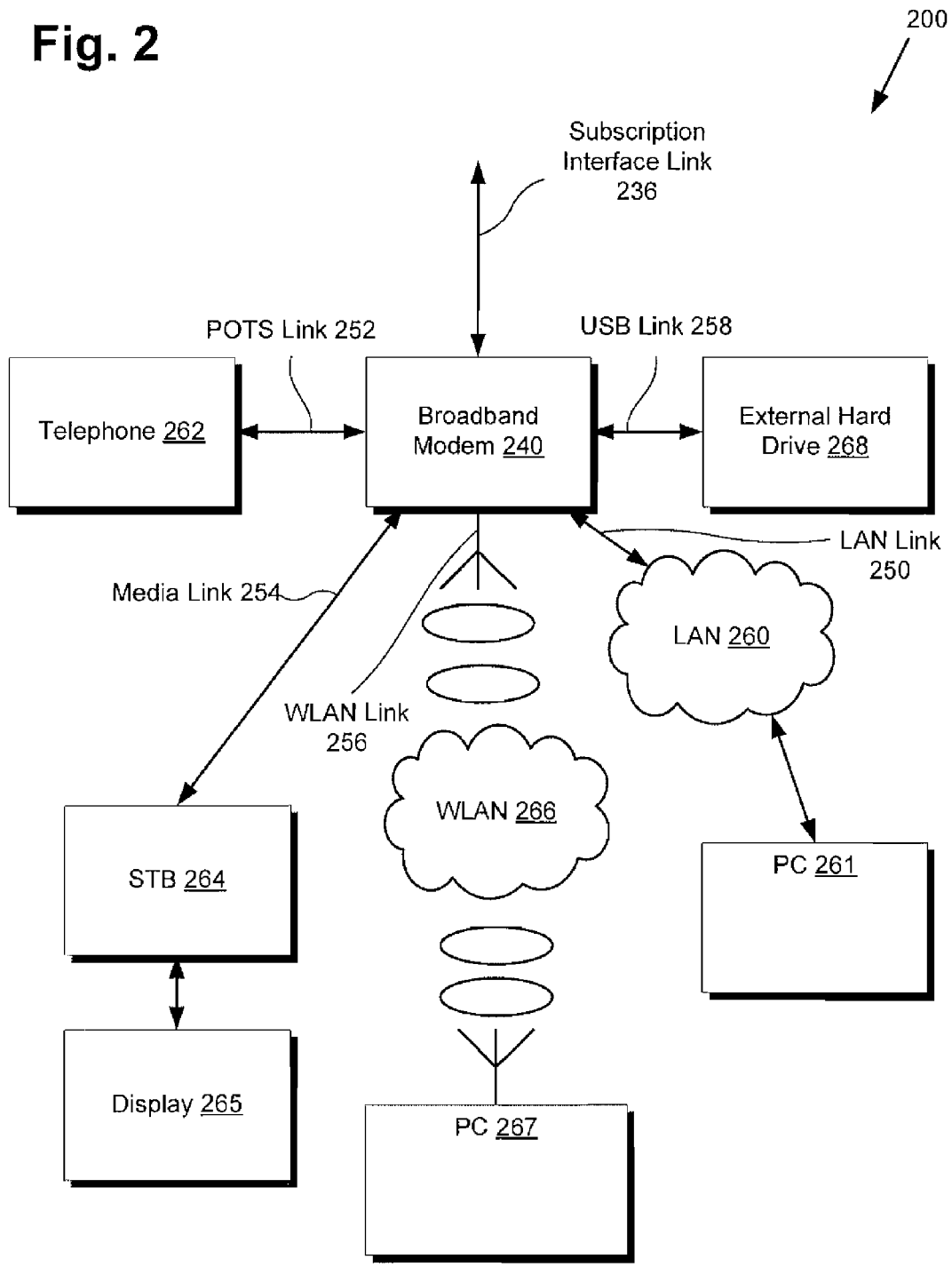
FIG. 2 presents a diagram of a system for secure provisioning of consumer network services, according to one embodiment of the present invention.

FIG. 2 shows subscriber system 200 illustrating some examples of managed services that may be provided securely utilizing embodiments of the present inventive concepts. As shown in FIG. 2, subscriber system 200 includes broadband modem 240 providing network services for telephone 262, set-top box (STB) 264, personal computers (PCs) 261 and 267, and external hard drive 268. Broadband modem 240 and subscription interface link 236 of FIG. 2 correspond, respectively, to broadband modems 140*a*, 140*b* and 140*c* and subscription interface links 136 of FIG. 1; e.g., each may be configured to exhibit the same features and/or operate substantially the same as its counterpart. For example, broadband modem 240 may include a ROM and a controller, where the controller is configured to download subscriber firmware from a subscription server enabling one or more of the managed interfaces corresponding to the managed interface links shown in FIG. 2. Furthermore, the downloaded subscriber firmware may be configured to allow utilization of each of the interfaces.

For example, upon being enabled by subscriber firmware downloaded over subscription interface link 236, a telephony interface, such as plain old telephone service (POTS) link 252, for example, may be configured to connect to a standard telephone, for example, and broadband modem 240 may be configured to provide telephone service, such as internet protocol (IP) telephone service, using subscription interface link 236. In other embodiments, POTS link 252 may instead be a cellular link. Similarly, broadband modem 240 may be configured, by downloaded subscriber firmware for example, to use media link 254 to provide video data to STB 264, for example, for display to a subscriber using display 265. Media link 254 may comprise a cable TV link, HDMI link, or even an analog RCA link, and may be configured to provide digital data or analog media to STB 264, for example.

Broadband modem 240 may also be configured, by downloaded subscriber firmware, to provide wired or wireless local area networking to PCs 261 and 267. For example, such downloaded subscriber firmware may enable a network switch integral with broadband modem 240, for example, and configure broadband modem 240 to act as a residential gateway, router, firewall, WiFi encryption/security, or network address translation device that may configurable by a subscriber through, for example, local area network (LAN) link 250. Such configuration data may be stored internally in broadband modem 240, for example, such an in a relatively small internal flash, or can be stored in a headend or a subscription server accessed using subscription interface link 236. Additionally, downloaded subscriber firmware may be configured to enable a USB interface corresponding to USB link 258, allowing access to external hard drive 268, for example, which can be used to provide network attached storage services to, for example, a subscriber using PC 267. In other embodiments, USB link 258 may instead be an external serial advanced technology attachment (eSATA) link or a firewire link, for example.

Although each managed interface corresponding to interface links 250, 252, 254, 256, 258 shown in FIG. 2 are shown as predominately enabled and functioning in FIG. 2, it should be understood that downloaded subscriber firmware may be modularized, for example, such that only some or one of the managed interfaces is enabled according to the subscription contracted for by the subscriber and the specific subscription firmware module downloaded. By providing such a modular system, embodiments of the present invention can advantageously provide granular as well as secure provisioning of network services, by selectively enabling only those network services to the extent they are subscribed, and by disabling all network services corresponding to managed interfaces upon power loss, for example, or a power cycle forced by an ISP through, for example, the downloaded subscriber firmware.

FIG. 4 shows a flow chart illustrating a method for a controller of a broadband modem, such as controller 342*b* of broadband modem 340*b* in FIG. 3*b* for example, for secure provisioning of a network service, such as any of the subscribed services depicted in FIGS. 1 and 2, for example, according to an embodiment of the present invention. Certain details and features have been left out of flowchart 400 that are apparent to a person of ordinary skill in the art. For example, a step may consist of one or more substeps or may involve specialized equipment, as known in the art. Steps 410 through 450 indicated in flowchart 400 are sufficient to describe one embodiment of the present invention; however, other embodiments of the invention may make use of steps different from those shown in flowchart 400. Embodiments of the present invention, as depicted in FIGS. 1 through 3, will be used to explain the method illustrated by flowchart 400 in FIG. 4.

Referring now to step 410 of the method embodied in FIG. 4, step 410 of flowchart 400 comprises controller 342*b* detecting a power-on state of broadband modem 340*b* in FIG. 3*b*. In one embodiment, a power-on state may be detected at start up of broadband modem 340*b*, for example. In other embodiments, a power-on state may be detected after a re-boot, for example, that may be forced by an ISP using either headend 130 in FIG. 1 or a downloaded subscriber firmware, or a combination of both.

Continuing with step 420 in FIG. 4, step 420 comprises controller 342*b* enabling an unmanaged interface of broadband modem 340*b*. As described above, ROM 343*b* may be configured to contain software to initialize controller 342*b* and to enable unmanaged interfaces 346*b*, which may comprise one or more interfaces able to form and/or authenticate a subscription interface link. For example, in one embodiment, ROM 343*b* may include a DSL PHY enabling a DSL interface of broadband modem 340*b*. Such DSL PHY may include an ability to perform a handshake with headend 130 in FIG. 1, for example, and to perform an authentication step, as will be described below.

Moving now to step 430 in FIG. 4, step 430 comprises controller 342*b* establishing subscription interface link 136 in FIG. 1 over an enabled unmanaged interface of unmanaged interfaces 346*b*. As noted above, in some embodiments, this may include a handshake process performed with headend 130 in FIG. 1, as well as an authentication step. For instance, in one embodiment, ROM 343*b* may include a modem-specific identifier that may be used to securely identify and thus authenticate broadband modem 340*b* to, for example, headend 130. Alternatively, where broadband modem 340*b* is configured to access relatively small flash 345*b*, for example, broadband modem 340*b* may be configured to authenticate to headend 130 using subscriber specific data in flash 345*b*. Regardless of the method used to establish subscription interface link 136, all software needed to establish such a link resides within ROM 343*b* of controller 342*b*.

Continuing with step 440 in FIG. 4, step 440 comprises controller 342*b* downloading, over subscription interface link 136, a subscriber firmware enabling at least one of managed interfaces 348*b* corresponding to a desired network service, such as any of the network services associated with interface links 250, 252, 254, 256, 258 shown in FIG. 2. In some embodiments, and as described above, such subscription firmware may be downloaded from headend 130 in FIG. 1, for example, or from subscription server 110, or partly from both.

Step 450 in FIG. 4 comprises controller 342*b* executing a subscriber firmware, downloaded as described above, thereby enabling at least one of managed interfaces 348*b* and provisioning a corresponding network service, such as any of the network services associated with interface links 250, 252, 254, 256, 258 shown in FIG. 2, as explained above. For example, a subscriber firmware may be configured to enable wireless local area network (WLAN) link 256 and provision WLAN 266 for wireless networking between subscriber PCs, for example. As such, the subscriber firmware may include software for residential gateway services for WLANs, such as routing, firewall, wireless encryption, and the like.

As explained above, by providing such a configurable secure provisioning system and method, embodiments of the present invention provide a competitive advantage to ISPs by allowing ISPs to include a wide array of additional features without risking portability or subscriber manipulation of hardware, firmware, or subscription limits. Furthermore, embodiments of the present invention allow secure provisioning systems to be manufactured significantly more cost effectively by removing costs associated with relatively large flash implementations.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A broadband modem for secure provisioning of a network service, the broadband modem comprising:
    a controller including an embedded memory, the controller configured to:
        enable an unmanaged interface of the broadband modem using a software stored in the embedded memory;
        establish a subscription interface link over the enabled unmanaged interface using the software stored in the embedded memory; and
        download, over the subscription interface link, a subscriber firmware enabling a managed interface corresponding to the network service;
    wherein the broadband modem is exclusive of firmware for enabling the managed interface prior to the download, erases the downloaded subscriber firmware, and disables the managed interface upon a power cycle.

2. The broadband modem of claim 1, wherein the subscriber firmware is stored in a volatile memory of the broadband modem.

3. The broadband modem of claim 1, further comprising a flash memory module sized to store subscriber configuration data;
    the controller being configured to establish the subscription interface link using at least a portion of the subscriber configuration data.

4. The broadband modem of claim 1, wherein the subscription interface link comprises an interface link to a headend of an internet services provider;
    the controller being configured to download at least a portion of the subscriber firmware from the headend.

5. The broadband modem of claim 1, wherein the subscription interface link comprises an interface link to a headend of an internet services provider;
    the controller being configured to download at least a portion of the subscriber firmware from a subscription server coupled to the headend.

6. The broadband modem of claim 1, wherein the network service corresponds to multiple managed interfaces, and the downloaded subscriber firmware enables the multiple managed interfaces.

7. The broadband modem of claim 1, wherein the managed interface comprises a broadband subscription interface.

8. The broadband modem of claim 1, wherein the managed interface comprises a volatile memory interface.

9. The broadband modem of claim 1, wherein the managed interface comprises a flash memory interface.

10. The broadband modem of claim 1, wherein the managed interface comprises an interface selected from the group of a wired LAN interface, a wireless LAN interface, an attached storage device interface, a media interface and a telephony interface.

11. The broadband modem of claim 1, wherein the unmanaged interface comprises an interface selected from the group of a DSL interface, a broadband cable interface and a wireless broadband interface.

12. A method for execution by a controller of a broadband modem for secure provisioning of a network service, the method situated in an embedded memory of the controller and comprising:
    enabling an unmanaged interface of the broadband modem using a software stored in the embedded memory;
    establishing an authenticated subscription interface link over the enabled unmanaged interface using the software stored in the embedded memory to authenticate the subscription interface link; and downloading, over the authenticated subscription interface link, a subscriber firmware enabling a managed interface corresponding to the network service;

wherein the broadband modem erases the downloaded subscriber firmware and disables the managed interface upon a power cycle, and the broadband modem is exclusive of firmware for enabling the managed interface prior to the download.

13. The method of claim 12, wherein establishing the subscription interface link comprises authenticating the subscription interface link using a flash memory module of the broadband modem that is sized to store subscriber configuration data.

14. The method of claim 12, wherein the subscription interface link comprises an interface link to a headend of an internet services provider;

the method further comprising downloading at least a portion of the subscriber firmware from the headend.

15. The method of claim 12, wherein the subscription interface link comprises an interface link to a headend of an internet services provider;

the method further comprising downloading at least a portion of the subscriber firmware from a subscription server separate from the headend.

16. The method of claim 12, wherein the network service corresponds to multiple managed interfaces, and the downloaded subscriber firmware enables the multiple managed interfaces.

17. The method of claim 12, wherein the managed interface comprises a broadband subscription interface.

18. The method of claim 12, wherein the managed interface comprises an interface selected from the group of a wired LAN interface, a wireless LAN interface, an attached storage device interface, a media interface and a telephony interface.

19. The method of claim 12, wherein the unmanaged interface comprises an interface selected from the group of a DSL interface, a broadband cable interface and a wireless broadband interface.

\* \* \* \* \*